United States Patent
Nakashima et al.

(10) Patent No.: US 8,270,687 B2
(45) Date of Patent: Sep. 18, 2012

(54) APPARATUS AND METHOD OF SUPPORTING DIAGNOSTIC IMAGING FOR MEDICAL USE

(75) Inventors: Kuniyoshi Nakashima, Kashiwa (JP); Toru Nakagawa, Hitachi (JP)

(73) Assignee: Hitachi Medical Corporation, Tokyo (JP)

( * ) Notice: Subject to any disclaimer, the term of this patent is extended or adjusted under 35 U.S.C. 154(b) by 966 days.

(21) Appl. No.: 10/552,136

(22) PCT Filed: Apr. 7, 2004

(86) PCT No.: PCT/JP2004/004993
§ 371 (c)(1), (2), (4) Date: Oct. 6, 2005

(87) PCT Pub. No.: WO2004/089219
PCT Pub. Date: Oct. 21, 2004

(65) Prior Publication Data
US 2006/0204063 A1  Sep. 14, 2006

(30) Foreign Application Priority Data

Apr. 8, 2003 (JP) ................................. 2003-103677
Jul. 10, 2003 (JP) ................................. 2003-194954

(51) Int. Cl.
*G06K 9/00* (2006.01)

(52) U.S. Cl. ........ 382/128; 382/130; 382/131; 382/173; 382/171; 382/174; 382/190; 382/199; 382/203; 128/922

(58) Field of Classification Search .................. 382/128, 382/130, 131, 173, 171, 174, 190, 199, 203; 128/922; 378/4, 5, 98.12
See application file for complete search history.

(56) References Cited

U.S. PATENT DOCUMENTS

| | | | |
|---|---|---|---|
| 6,278,761 B1* | 8/2001 | Kim et al. | 378/8 |
| 7,155,047 B2* | 12/2006 | Wollenweber | 382/131 |
| 2003/0059093 A1* | 3/2003 | Rosania et al. | 382/128 |
| 2003/0095695 A1* | 5/2003 | Arnold | 382/131 |

(Continued)

FOREIGN PATENT DOCUMENTS

JP 2002-222410 8/2002

(Continued)

OTHER PUBLICATIONS

Grauer, Wo; et al. Quantification of body fat distribution in the abdomen using computed tomography. American Journal of Clinical Nutrition, Apr. 1984, vol. 39, 631-637.*

(Continued)

*Primary Examiner* — Matthew Bella
*Assistant Examiner* — Julian Brooks
(74) *Attorney, Agent, or Firm* — Cooper & Dunham LLP

(57) ABSTRACT

A medical image diagnosing support apparatus comprises: a first extraction means which extracts a body region of a subject from a tomographic image of the subject acquired by a medical tomographic apparatus; a second extraction means which extracts a non-adipose region from the body region; a third extraction means which extracts a total body adipose region from the body region; a separation means which separates the total body adipose region into a visceral adipose region and a subcutaneous adipose region based on positional information of the non-adipose region; and a display control means which controls of displaying the tomographic image on an image display device with clear indication of the visceral adipose region and the subcutaneous adipose region.

19 Claims, 16 Drawing Sheets

U.S. PATENT DOCUMENTS

2004/0101086 A1* 5/2004 Sabol et al. .................. 378/4
2004/0207625 A1* 10/2004 Griffin et al. ............... 345/440

FOREIGN PATENT DOCUMENTS

| JP | 2003-61949 | 3/2003 |
|---|---|---|
| JP | 2003-339694 | 12/2003 |
| JP | 2004-57275 | 2/2004 |
| WO | WO 02103065 A2 * | 12/2002 |

OTHER PUBLICATIONS

Seidell, JC. et al. Assessment of intra-abdominal and subcutaneous abdominal fat: relation between anthropometry and computed tomography. American Journal of Clinical Nutrition, 1987, vol. 45, pp. 7-13.*

Kvist, H; et al. Total and visceral adipose-tissue volumes derived from measurements with computed tomography in adult men and women: predictive equations. American Journal of Clinical Nutrition, 1988, vol. 48, 1351-1361.*

Borkan, GA; et al. Assessment of abdominal fat content by computed tomography. American Journal of Clinical Nutrition, Jul. 1982, vol. 36, pp. 172-177.*

Li, et al "A boundary optimization algorithm for delineating brain objects from CT-scans", IEEE, published 1993, pp. 1553-1557.*

* cited by examiner

W=26601 V=9545 S=17056
V/W=0.36 S/W=0.64 V/S=0.56

1301   1301

APPARATUS AND METHOD OF SUPPORTING DIAGNOSTIC IMAGING FOR MEDICAL USE

TECHNICAL FIELD

This disclosure relates to a medical image diagnosing support apparatus and method for measuring body adipose of a subject based on a tomographic image of the subject acquired by a medical tomographic apparatus such as an X-ray CT (computed tomography) apparatus or an MRI (magnetic resonance imaging) apparatus, More particularly, the present invention relates to a medical image diagnosing support apparatus and method that can automatically separately measure subcutaneous adipose and visceral adipose using information on a periphery of adipose tissue such as muscle tissue of the subject.

BACKGROUND ART

Japanese Patent Application Laid-Open No. 2002-222410 discloses an image diagnosing apparatus that measures body adipose of a subject based on a tomographic image of the subject acquired from a medical tomographic apparatus. The image diagnosing apparatus sets a boundary between subcutaneous adipose and visceral adipose with respect to a peripheral edge of a muscle region by a rolling ball method. This has a problem that the subcutaneous adipose and the visceral adipose are sometimes improperly separated depending on individual differences among subjects. The image diagnosing apparatus also has a problem of an unclear image display of a measurement result. Further, the image diagnosing apparatus extracts, as an adipose region, a region where a CT value is within a threshold range set by an operator. This causes an unnecessary minute adipose region such as feces remaining in intestine to be included in the extraction region, and for precise measurement, the operator has to manually remove the unnecessary region. The image diagnosing apparatus sequentially performs the steps of extraction of a body surface region of interest, extraction of a total body adipose region, extraction of a visceral region of interest, extraction of a visceral adipose region, and calculation of body adipose. This has a problem that each step includes many computations, and enhancing the speed of the processing is not considered.

DISCLOSURE OF THE INVENTION

In an aspect of this disclosure, there is provided a medical image diagnosing support apparatus comprising: a first extraction means which extracts a body region of a subject from a tomographic image of the subject acquired by u medical tomographic apparatus; a second extraction means which extracts a non-adipose region from the body region; a third extraction means which extracts a total body adipose region from the body region; a separation means which separates the total body adipose region into a visceral adipose region and a subcutaneous adipose region based on positional information of the non-adipose region; and a display control means which controls to display the tomographic image on an image display device with clear indication of the visceral adipose region and the subcutaneous adipose region.

In another aspect of this disclosure, there is provided a medical image diagnosing support method comprising: a first extraction step of extracting a body region of a subject from a tomographic image of the subject acquired by a medical tomographic apparatus; a second extraction step of extracting a non-adipose region front the body region; a third extraction step of extracting is a total body adipose region from the body region; a separation step of separating the total body adipose region into a visceral adipose region and a subcutaneous adipose region based on positional information of the non-adipose region; and a display control step of controlling of displaying the tomographic image on an image display device with clear indication of the visceral adipose region and the subcutaneous adipose region.

Separation and measuring processing of the body adipose can be performed by following processing (1) to (7).
  (1) A body region is extracted from a tomographic image of a subject (the first extraction processing).
  (2) Each region of non-adipose regions such as an epidermal region, a muscle region, a bone region and the like is extracted (the second extraction processing).
  (3) The epidermal region (i.e., a region where epidermal tissue exists) which is extracted in the processing (2) is removed from the body region extracted in the processing (1).
  (4) The muscle region, the bone region and the like (non-adipose regions other than the epidermal region) are removed from the result of the processing
  (3). The result thus obtained is a total body adipose region. The processing (3) and (4) are the third extraction processing.

The total body adipose region is extracted from the body region by the above-described processing (1) to (4). That is, the epidermal region, which is one of non-adipose regions, is first removed from the body region, other non-adipose regions such as the muscle region, the bone region and the like are further removed from the result, and the total body adipose region is obtained by these processes.
  (5) An information of boundary of an abdominal region is set according to the position of information of the muscle and bone regions extracted in the processing (1).
  (6) A region where an inside of the abdominal region set in the processing (5) and the total adipose region extracted in the processing (4) overlap it: set as a visceral adipose region in the abdominal region.
  (7) In the total adipose region extracted by the processing (1) to (6), a region other than the visceral adipose region in the abdominal region (that is, a region where an inside of the boundary of the abdominal region set in the processing (5) and the total body adipose region extracted in the processing (4) does not overlap) is set as a subcutaneous adipose region.

By the above-described processing (5) to (7), the total adipose region is separated to the visceral adipose region and the subcutaneous adipose region (a separating processing).

In this disclosure, "a non-adipose region" means a region other than an adipose region, i.e., an extraction of total fat area.

In this disclosure, "an adipose region" means a region obtained by removing the non-adipose region from the body adipose region.

In the present invention, separation and measuring processing of the body adipose can be performed by following processing (1) to (7).
  (1) A body region is extracted from a tomographic image of a subject (the first extraction processing).
  (2) Each region of non-adipose regions such as an epidermal region, a muscle region, a bone region and the like is extracted (the second extraction processing).
  (3) The epidermal region (i.e., a region where epidermal tissue exists) which is extracted in the processing (2) is removed from the body region extracted in the processing (1).

(4) The muscle region, the bone region and (non-adipose regions other than the epidermal region are removed from the result of the processing (3). The result thus obtained is a total body adipose region. The processing, (3) and (4) are the third extraction processing.

The total body adipose region is extracted from the body region by the above-described processing (1) to (4). That is, the epidermal region, which is one of non-adipose regions, is first removed from the body region, other non-adipose regions such as the muscle region the bone region and the like are further removed from the result and the total body adipose region is obtained by these processes.

(5) An information of boundary of an abdominal region is set according to the positron of information of the muscle and bone regions extracted in the processing (1).

(6) A region where an inside of the abdominal region set in the processing (5) and the total adipose region extracted in the processing (4) overlap is set as a visceral adipose region in the abdominal region.

(7) In the total adipose region extracted by the processing (1) to (6), a region other than the visceral adipose region in the abdominal region (that is, a region where an inside of the boundary of the abdominal region set in the processing (5) and the total body adipose region extracted in the processing (4) does not overlap) is set as a subcutaneous adipose region.

By the above-described processing (5) to (7), the total adipose region is separated to the visceral adipose region and the subcutaneous adipose region (a separating processing), In the present invention, "a non-adipose region" maps a region other than an adipose region, i.e., an extraction of total fat area.

In the present invention, "an adipose region" means a region obtained by removing the non-adipose region from the body adipose region.

BEST MODE FOR CARRYING OUT THE INVENTION

Now, embodiments of the present invention will be described in detail with reference to the accompanying drawings.

Figure 1:
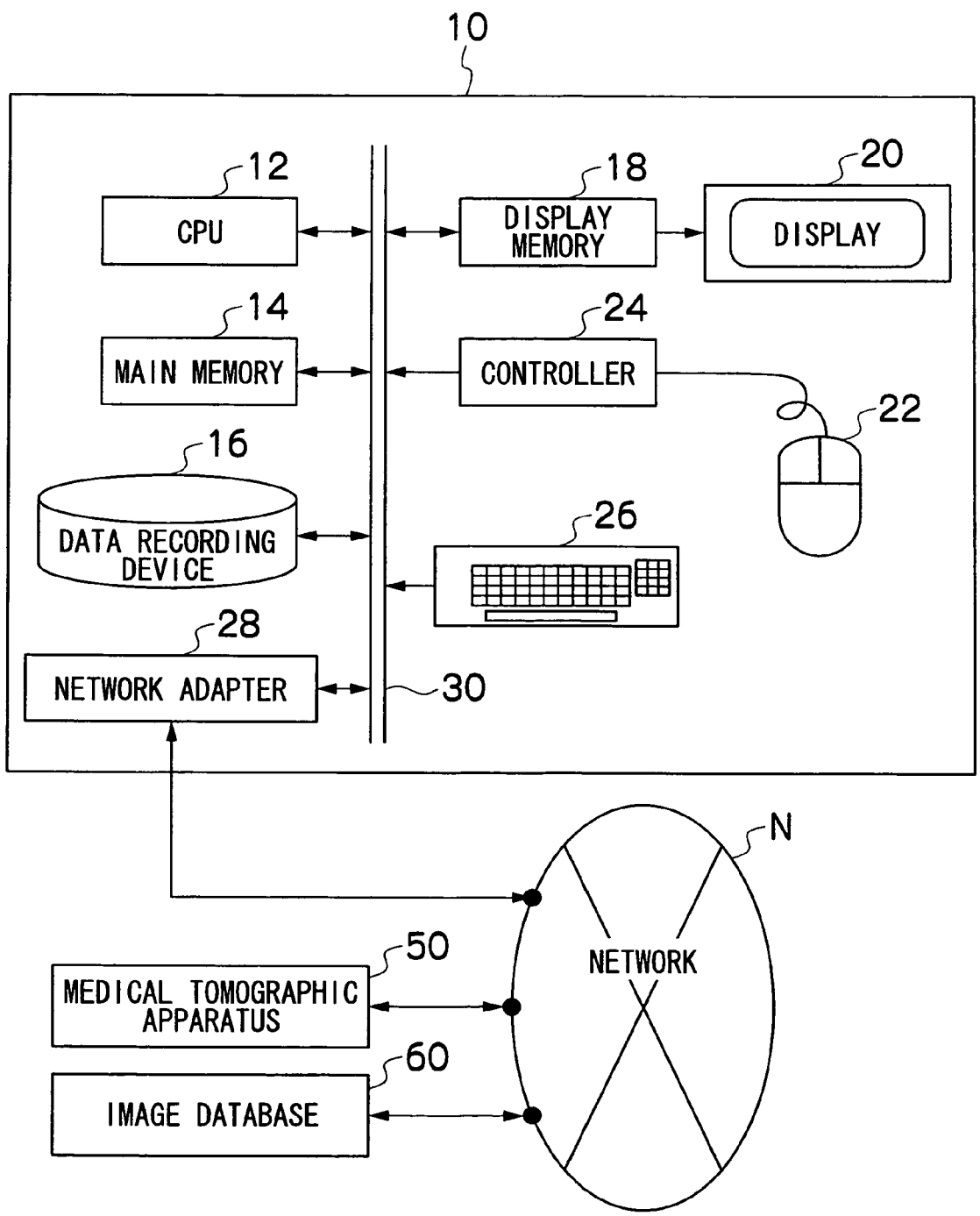
FIG. 1 is a schematic view of a configuration of a medical image diagnosing support apparatus according to an embodiment of the present invention.

FIG. 1 is a schematic view of a configuration of a medical image diagnosing support apparatus according to an embodiment of the present invention. The medical image diagnosing support apparatus 10 mainly includes a central processing unit (CPU) 12 that controls operations of components, a main memory 14 in which a control program of the medical image diagnosing support apparatus 10 is stored, a data recording device 16 in which tomographic image data of a subject and an operation program, or the like are stored, a display memory 18 that temporarily stores image data for display, a display 20 that displays an image based on the image data from the display memory 18, a pointing device 22 and a pointing device controller 24 such as a mouse, a trackball, or a touch panel for operating a soft switch on the display 20, a keyboard 26 having keys or switches for setting various parameters, a network adapter 28 for connecting the medical image diagnosing support apparatus 10 to a network N such as a local area network, a telephone line, or the Internet, and a bus 30 that connects the above described components. The data recording device 16 may be a storage device such as a memory or a magnetic disk internal or external to the medical image diagnosing support apparatus 10, a device for writing and reading data in and from ejectable external media, or a device for transmitting and receiving data to and from an external storage device via a network. The medical image diagnosing support apparatus 10 is connected to an external medical tomographic apparatus 50 or an image database 60 via the network adapter 28 and the network N, and transmits and receives image data thereto and therefrom.

Figure 2:
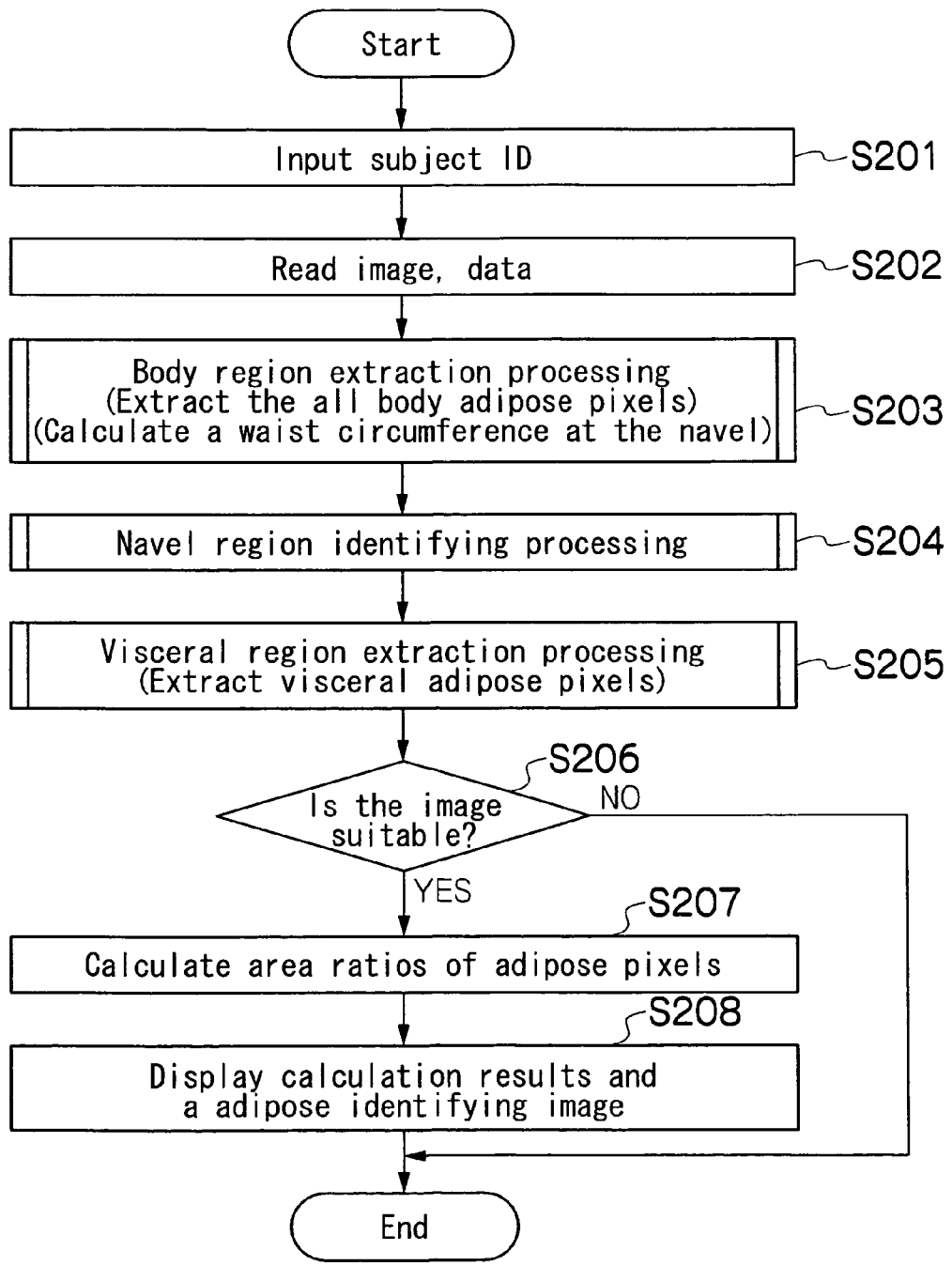
FIG. 2 is a flowchart of a first embodiment for measuring body adipose of a subject.

FIG. 2 is a flowchart of a first embodiment for measuring body adipose of a subject using the medical image diagnosing support apparatus 10 configured as described above. The CPU 12 controls the medical image diagnosing support apparatus 10 according to this flowchart.

First, an ID input screen of the subject is displayed on the display 20, and an operator inputs an ID number of the subject of diagnostic processing (S201). Then, based on the input ID number of the subject, image data for body adipose measurement processing is read from the data recording device 16, the medical tomographic apparatus 50, or the image database 60

(S202). Image data acquired by a medical tomographic apparatus such as an X-ray CT apparatus or an MRI apparatus is available, and CT image data acquired by the X-ray CT apparatus will be described by way of an example.

Next, body region extraction processing (S203), navel region identifying processing (S204), and visceral region extraction processing (S205) of the read image data are sequentially performed, and a visceral region is extracted. Then, based on the results of S204 and S205, it is determined whether the image of interest is suitable for body adipose measurement (S206). When it is determined that the image of interest is not suitable, the processing is finished. When it is determined in S206 that the image of interest is suitable, area ratios of adipose pixels are calculated (S207), and the measurement results are displayed by numeric values and an image (S208).

Figure 3:
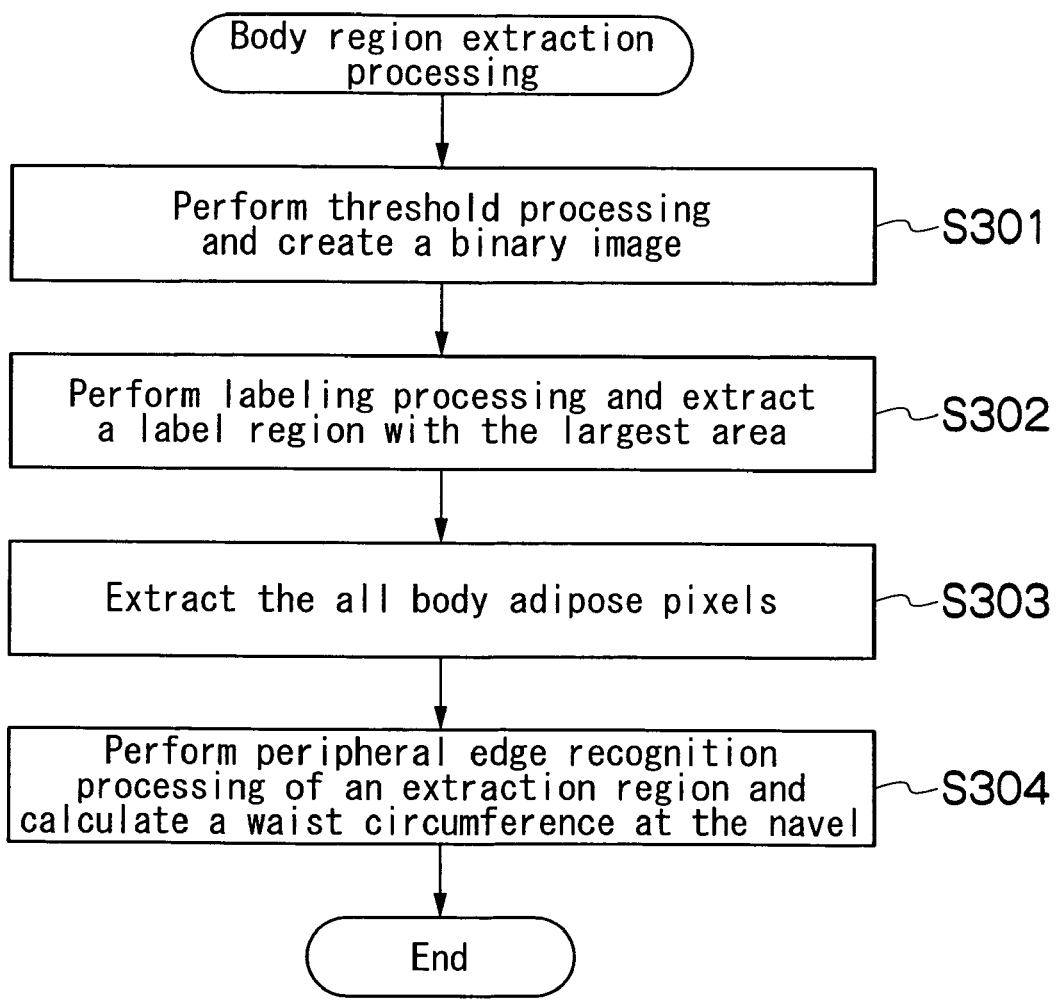
FIG. 3 is a flowchart of body region extraction processing.
Figure 4:
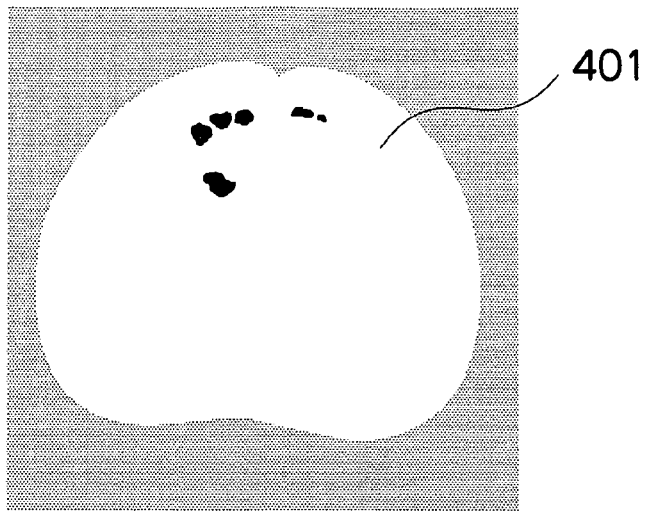
FIG. 4 is a conceptual drawing for illustrating the body region extraction processing.

Now, details of the steps in FIG. 2 will be described. FIG. 3 is a flowchart of the body region extraction processing (S203). First, threshold processing of the read image data is performed to create a binary image (S301). For the threshold, an adipose threshold is preset so that a region to be recognized as body adipose is clearly extracted. A pixel value (a CT value) of adipose is usually in a range of −150 to −50, and thus a CT value range of adipose may be sequentially searched for from a CT image with the most frequent CT value in the range of −150 to −50 as a median value in a CT value histogram to automatically set an adipose threshold. Next, two-dimensional labeling processing of the binary image created in S301 is performed to create a label image, and as shown in FIG. 4, a label region showing the largest area in the label image is extracted as a body region 401 (S302). Then, pixels having pixel values within the threshold range among pixels that form the body region 401 are extracted as adipose pixels, and "1" is stored in a position corresponding to the adipose pixels in an adipose image buffer (S303). The adipose pixels thus extracted correspond to the total body adipose including subcutaneous adipose and visceral adipose. Then, peripheral edge recognition processing is performed for each of the pixels that form the body region 401 with attention to eight pixels on a periphery of each pixel. Then, the number of pixels recognized as the peripheral edge is multiplied by the length of one side of one pixel to calculate a waist circumference at the navel (S304).

Figure 5:
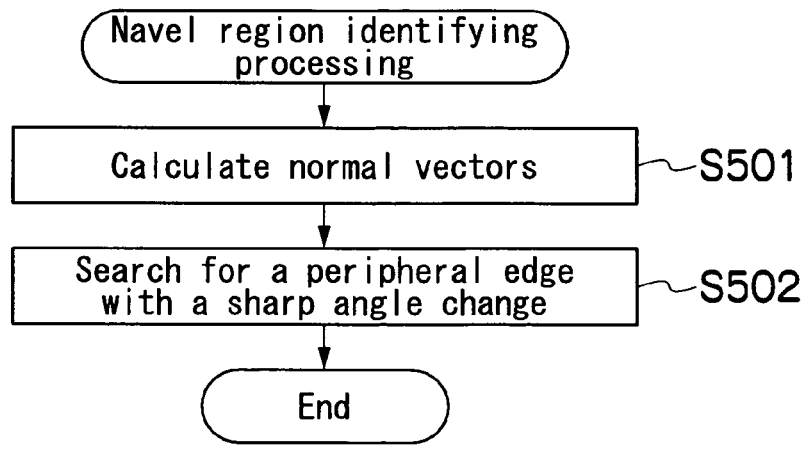
FIG. 5 is a flowchart of navel region identifying processing.
Figure 6:
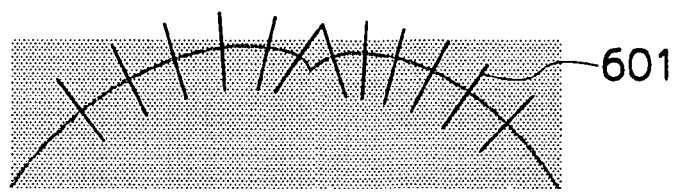
FIG. 6 is a conceptual drawing for illustrating the navel region identifying processing.

FIG. 5 is a flowchart of the navel region identifying processing (S204). First, in the peripheral edge of the body region recognized in S304, normal vectors 601 are calculated at regular intervals as shown in FIG. 6 (S501). Then, a navel region is identified based on the fact that the navel region is placed in an upper side of the tomographic image, and an angle change between adjacent normal vectors 601 is significantly large in the navel region (S502).

Figure 7:
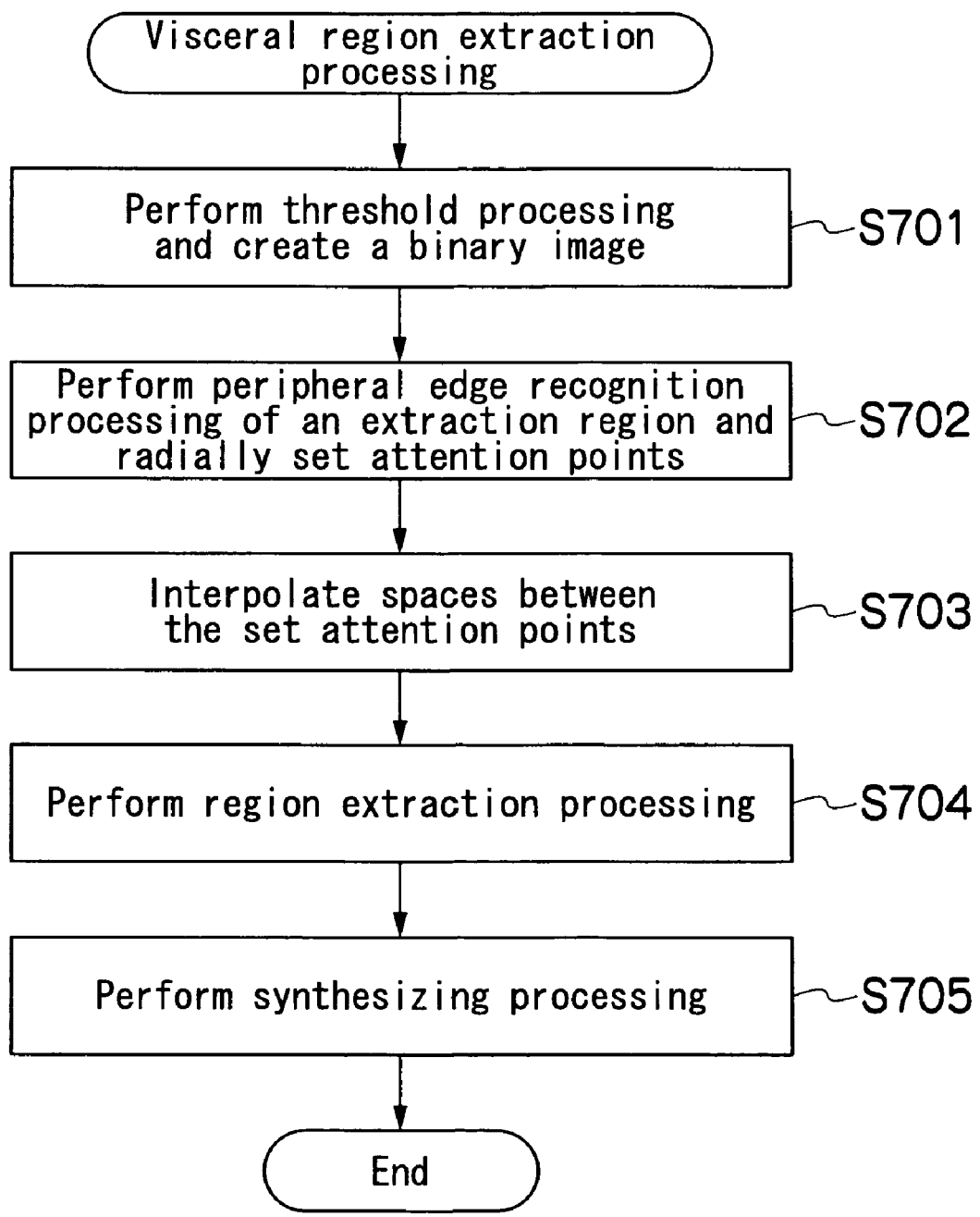
FIG. 7 is a flowchart of visceral region extraction processing.
Figure 8A:
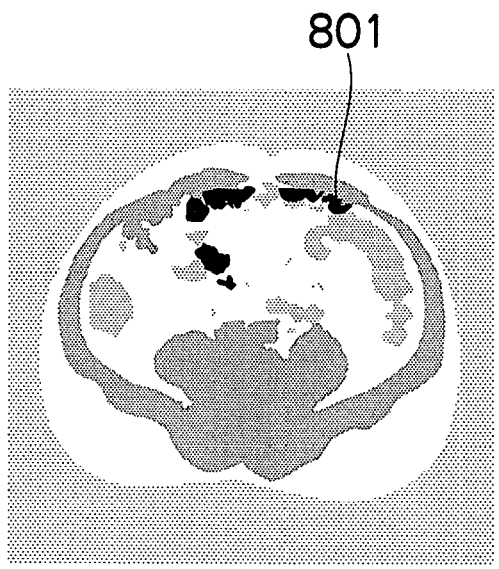
FIGS. 8(a), 8(b) and 8(c) are conceptual drawings for illustrating the visceral region extraction processing.

FIG. 7 is a flowchart of the visceral region extraction processing (S205). First, the threshold processing of the image data in the body region 401 is performed to create a binary image (S701). The threshold is preset so that a region (hereinafter referred to as an abdominal wall muscle layer region) 801 to be recognized as a muscle tissue layer (an abdominal wall muscle layer) and a bone tissue layer in FIG. 8(a) is clearly extracted. Also, a pixel value (a CT value) of the abdominal wall muscle layer is usually in a range of −50 to 100, and thus a CT value range of the abdominal wall muscle layer may be sequentially searched for from the CT image with the most frequent CT value in the range of −50 to 100 as a median value in the CT value histogram to automatically set a threshold. Next, peripheral edge recognition processing of the binary image created in S701 is performed to radially set attention points on the recognized peripheral edge (S702).

Figure 8B:
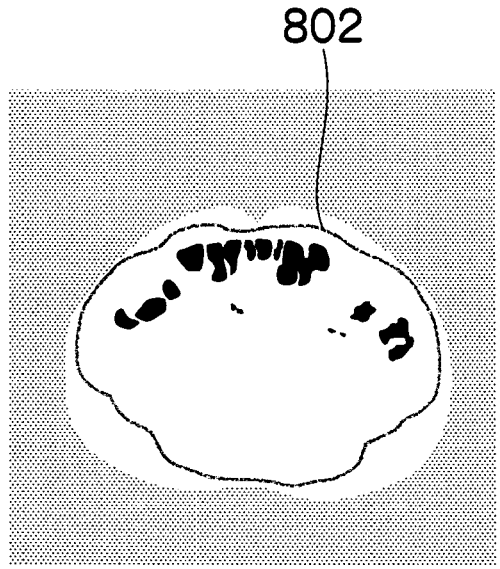
Figure 8C:
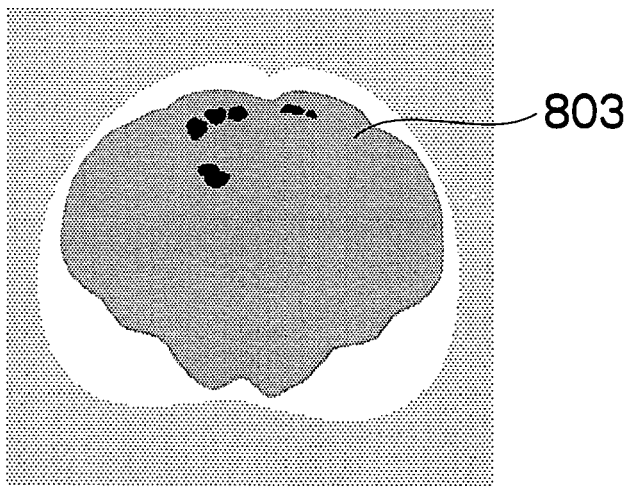

The recognized peripheral edge is traced to extract an outline of the abdominal wall muscle layer including the whole viscus. However, actually, the abdominal wall muscle layer does not continuously surround the viscus but gaps are present in several spots, and thus for such an abdominal wall muscle layer with the gaps, the outline of the abdominal wall muscle layer including the whole viscus cannot be extracted simply by tracing the peripheral edge. Thus, spaces between the attention points set in S702 are interpolated by higher order spline interpolation to interpolate the gaps in the abdominal wall muscle layer and extract an outline 802 of the visceral region as shown in FIG. 8(b) (S703). In S703, the higher order spline interpolation can be performed by publicly known method. Then, region extraction processing of the outline 802 using a region expansion method is performed to extract a visceral region 803 as shown in FIG. 8(c) (S704). Next, pixels having pixel values within the adipose threshold range among pixels that form a region obtained by subtracting the abdominal wall muscle layer region 801 from the visceral region 803 are extracted as adipose pixels, and "2" is stored in a position corresponding to the adipose pixels in the adipose image buffer (S705). The adipose pixels thus extracted correspond to the visceral adipose.

Figure 9:
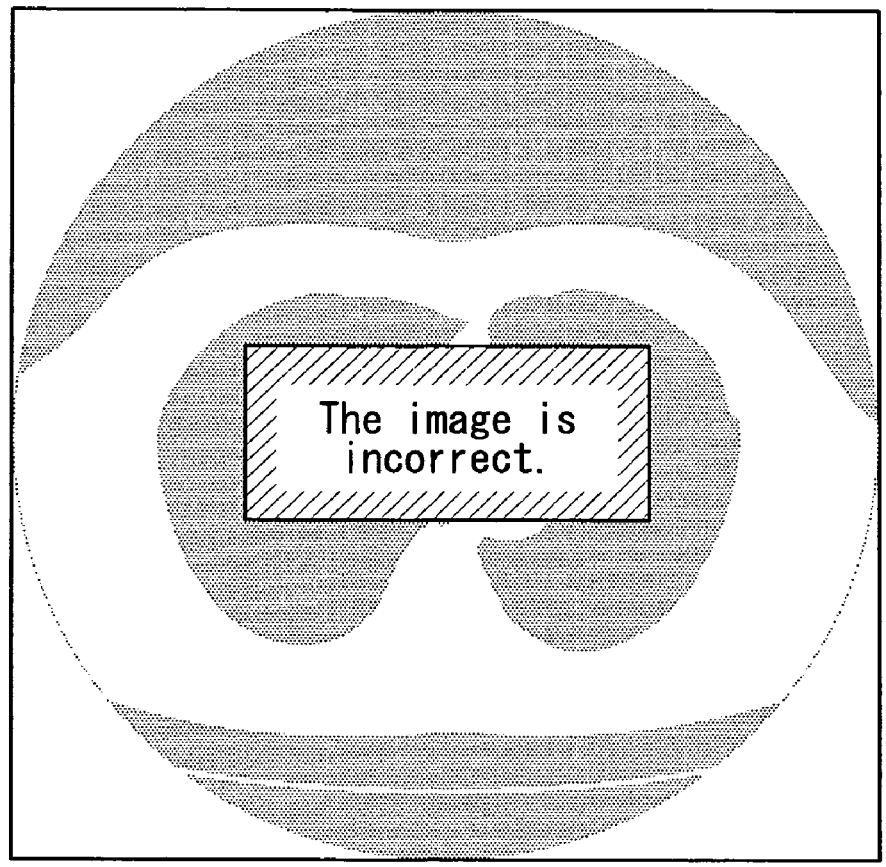
FIG. 9 shows an example of a display of an error message.

In the determination whether the image of interest is suitable (S206), it is determined that the image of interest is suitable when the percentage of an air region in the visceral region 803 obtained in S205 is less than 60% and the navel region has been able to be identified in S204, and the process proceeds to S207. When it is not determined that the image of interest is suitable in S206 because the image of interest is an image obtained from a site other than abdominal such as lung field, or the image is not a CT image, a message such as "The image is incorrect" is output on the display 20 as shown in FIG. 9 to finish the processing.

In the calculation of the area ratios of the adipose pixels (S207), the number of pixels S corresponding to the subcutaneous adipose is calculated from the number of pixels W corresponding to the total body adipose extracted in S303 and the number of pixels V corresponding to the visceral adipose extracted in S705, and the ratio V/W between the visceral adipose and the total body adipose, the ratio S/W between the subcutaneous adipose and the total body adipose, and the ratio V/S between the visceral adipose and the subcutaneous adipose are calculated.

Figure 10:
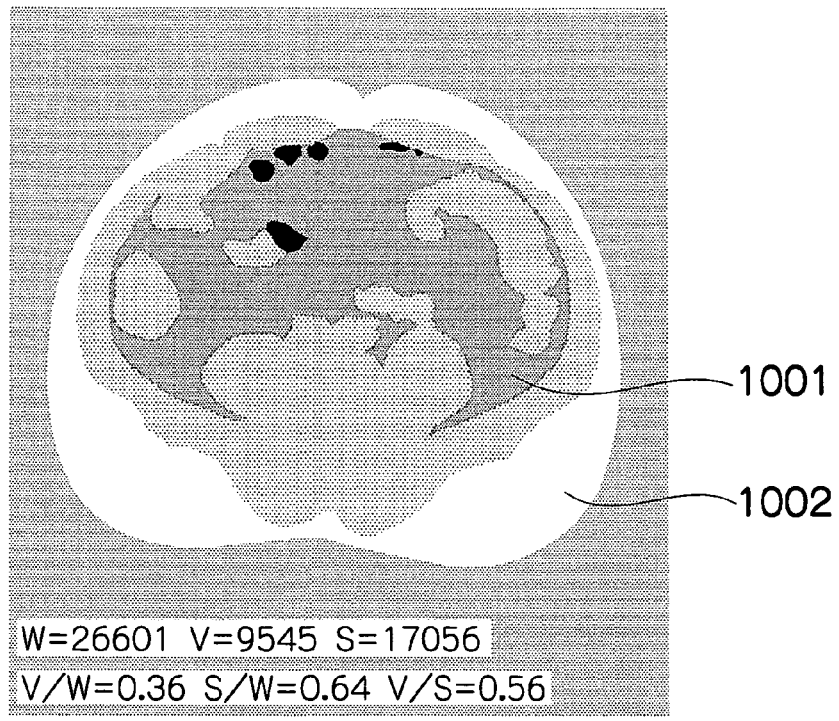
FIG. 10 shows an example of a display of a measurement result.
Figure 11:
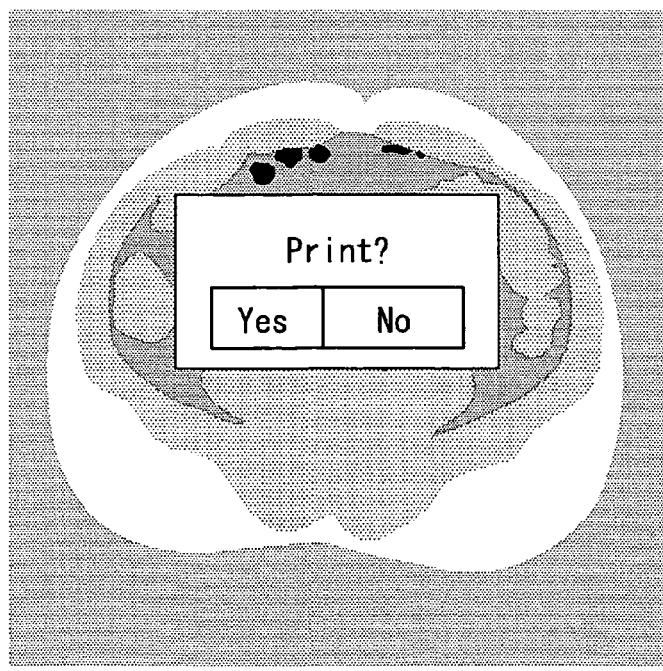
FIG. 11 shows an example of a display of print processing selection.

In the display of the measurement result (S208), as shown in FIG. 10, the visceral adipose 1001 and the subcutaneous adipose 1002 are displayed on the display 20 with different colors or densities so as to be distinguishable, and the numeric values calculated in S207 are displayed. After S208, printing of the display image may be selectable as shown in FIG. 11 so that the body adipose measurement result is printed and handed to the subject.

Figure 12:
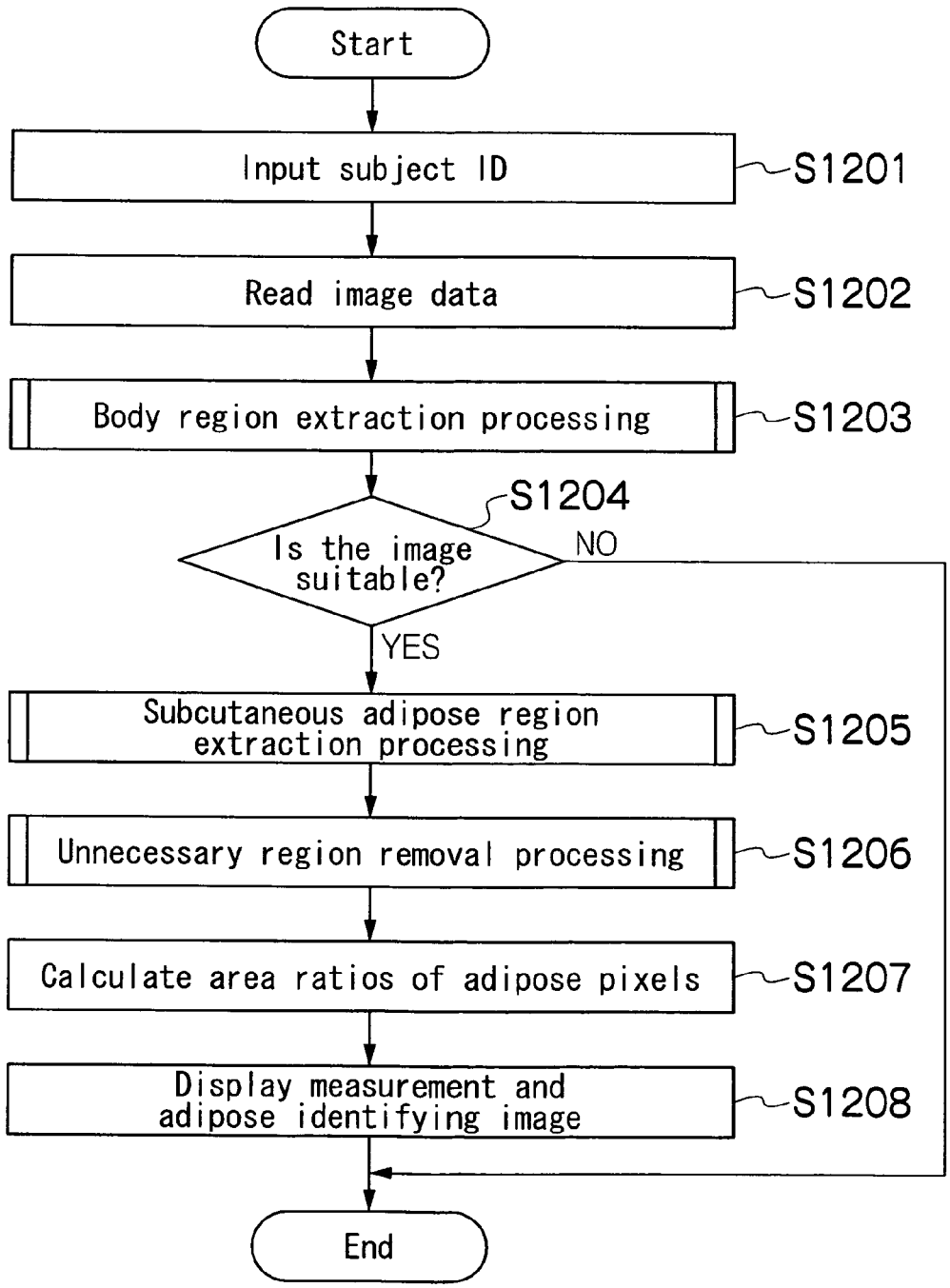
FIG. 12 a flowchart of a second embodiment for measuring body adipose of a subject.
Figure 13:
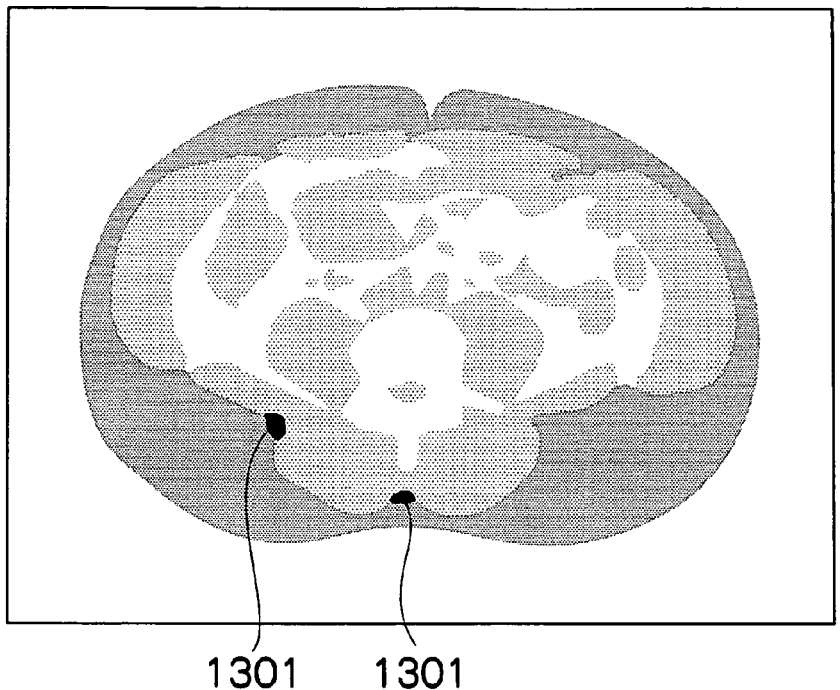
FIG. 13 is a conceptual drawing of an adipose region near a muscle region in the back.

FIG. 12 is a flowchart of a second embodiment for measuring body adipose of a subject using a medical image diagnosing support apparatus 10. Generally, in an abdominal tomographic image, all regions obtained by subtracting a visceral organ region such as bone, muscle and intestine, and a gas region from the tomographic image are considered as adipose regions. Thus, such subtracting processing allows the adipose region to be extracted even without threshold processing based on a CT value. In some cases, an adipose region 1301 near a muscle region in the back is improperly recognized to reduce measurement accuracy as shown in FIG. 13. Thus, in the second embodiment, a subcutaneous adipose region is recognized based on positional information of a muscle region in the abdominal wall layer to allow the adipose region in the back to be precisely recognized for more precise measurement of the body adipose.

Input of a subject ID (S1201), image data reading (S1202), and body region extraction processing (S1203) in FIG. 12 are the same as in S201, S202 and S203 in FIG. 2. Then, it is determined whether the image of interest is suitable for body adipose measurement (S1204). When it is determined that the image of interest is not suitable, the process is finished. When it is determined in S1204 that the image of interest is suitable, subcutaneous adipose region extraction processing (S1205) and unnecessary adipose region removal processing (S1206) are performed to extract the adipose region. Calculation of area ratios of adipose pixels (S1207) and a display of measurement results (S1208) are the same as in S207 and S208 in FIG. 2.

Figure 14:
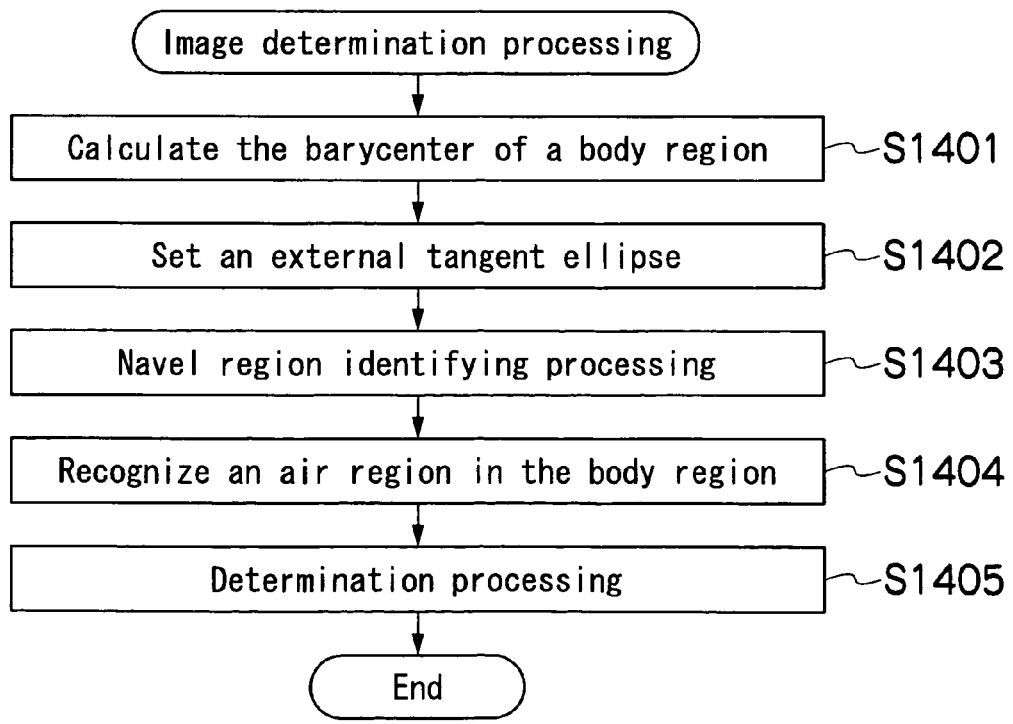
FIG. 14 a flowchart of image determination processing.
Figure 15:
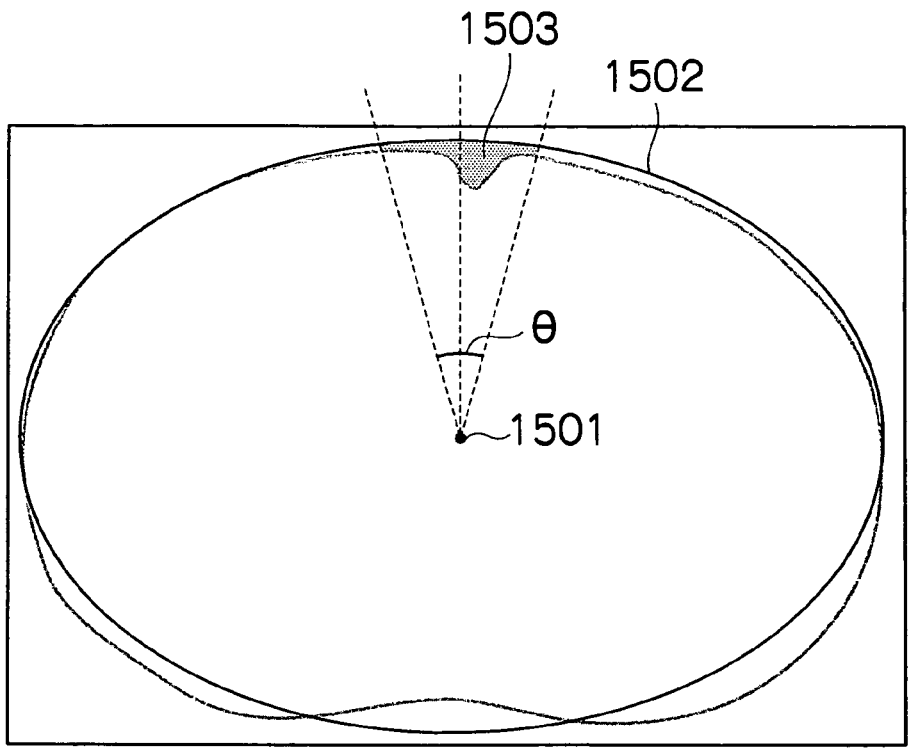
FIG. 15 is a conceptual drawing for illustrating a search for a navel region.

FIG. 14 is a flowchart of image determination processing (S1204). First, as shown in FIG. 15, the barycenter 1501 of the body region extracted in S1203 is calculated (S1401). Then, an ellipse 1502 is set so as to he tangent to a peripheral edge on the abdominal side of the body region (S1402). Then, a navel region 1503 is searched for based on the area of a region between the peripheral edge on the abdominal side of the body region and the external tangent ellipse 1502 with attention to a range of an angle θ in a predetermined direction around the barycenter 1501 (S1403). Then, threshold processing is performed using a threshold preset so as to allow recognition of air to recognize an air region in the body region (S1404). Then, only when the navel region 1503 is identified in S1403, and the air region recognized in S1404 is within a predetermined percentage in the body region, it is determined that the image of interest is suitable for the body adipose measurement (S1405).

Figure 16:
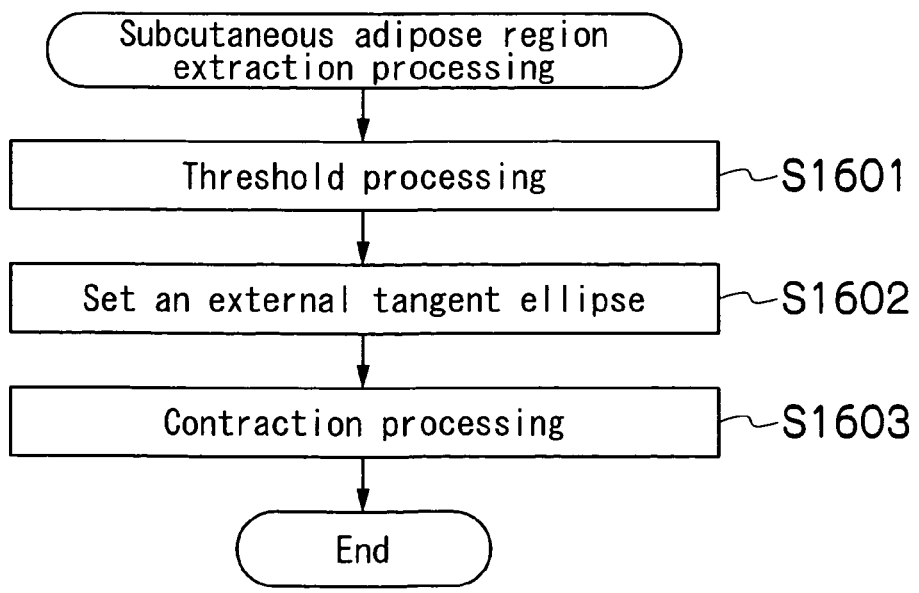
FIG. 16 is a flowchart of subcutaneous adipose region extraction processing.
Figure 17:
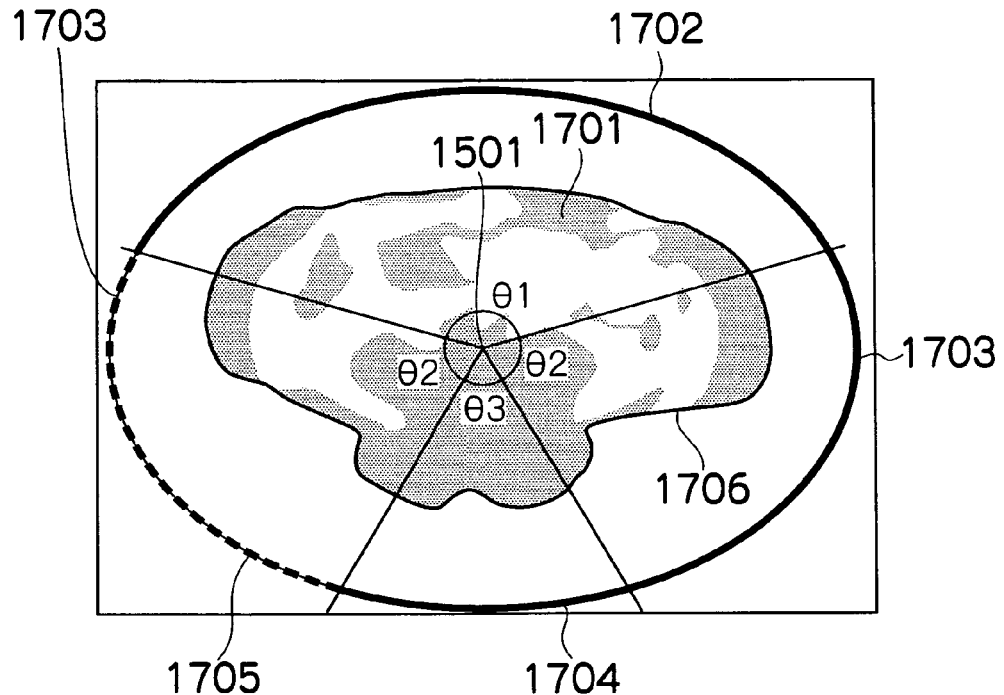
FIG. 17 is a conceptual drawing for illustrating the subcutaneous adipose region extraction processing.

FIG. 16 is a flowchart of the subcutaneous adipose region extraction processing (S1205). First, a preset threshold is used to perform threshold processing in order to recognize a muscle region 1701 in the body region extracted in S1203 in FIG. 17 (S1601). Then, the body region is divided into regions with angles θ1, θ2 and θ3 around the barycenter 1501 of the body region calculated in S1401, and ellipses 1702, 1703 and 1704 which are tangent to peripheral edges of the regions are set (S1602). Then, for each preset smaller region 1705, an external tangent line is contracted in the direction of the barycenter 1501 with the ellipses 1702, 1703 and 1704 as base points, and the contraction of the line is stopped when the line is tangent to the muscle region 1701, thereby obtaining an external tangent line 1706 of the muscle region 1701 (S1603). The region between the external tangent line 1706 and the ellipses 1702, 1703 and 1704 is the subcutaneous adipose region.

Figure 18:
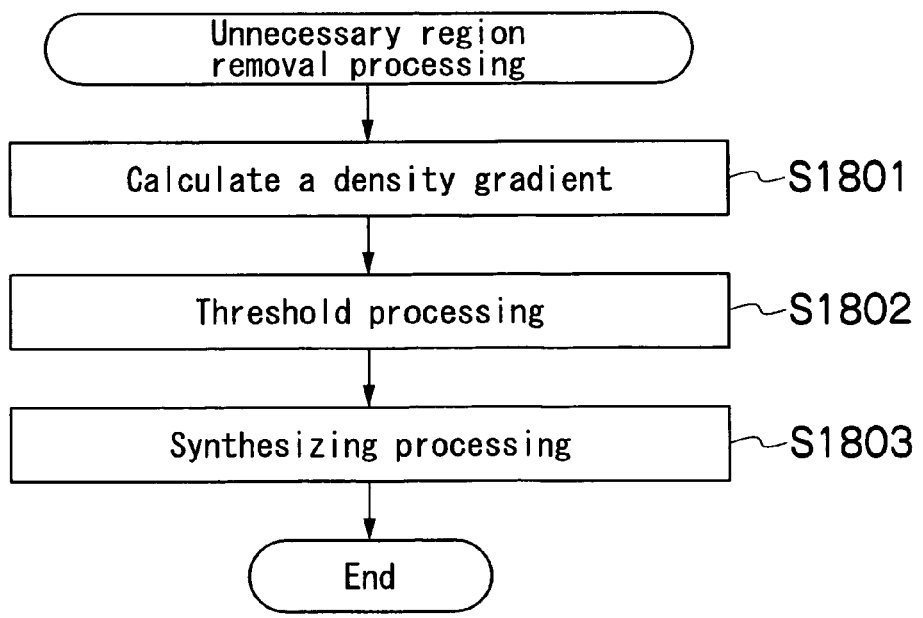
FIG. 18 a flowchart of unnecessary region removal processing.

FIG. 18 is a flowchart of the unnecessary region removal processing (S1206). The region obtained by removing the subcutaneous adipose region recognized in S1205 from the total body adipose region recognized in S1203 (S303) is a visceral adipose candidate region. A density gradient value of the CT value is calculated in the visceral adipose candidate region (S1801). Then threshold processing of the density gradient value is performed at an upper limit value and a lower limit value to extract a region with large dispersion in the CT values such as feces remaining in intestine (S1802). Then, a visceral adipose region is extracted by removing the muscle region 1701 extracted in S1601 and the region with large dispersion in the CT values extracted in S1802 from the visceral adipose candidate region, and the number of pixels in the visceral adipose region is counted to calculate the number of pixels of visceral adipose (S1803).

Figure 19:
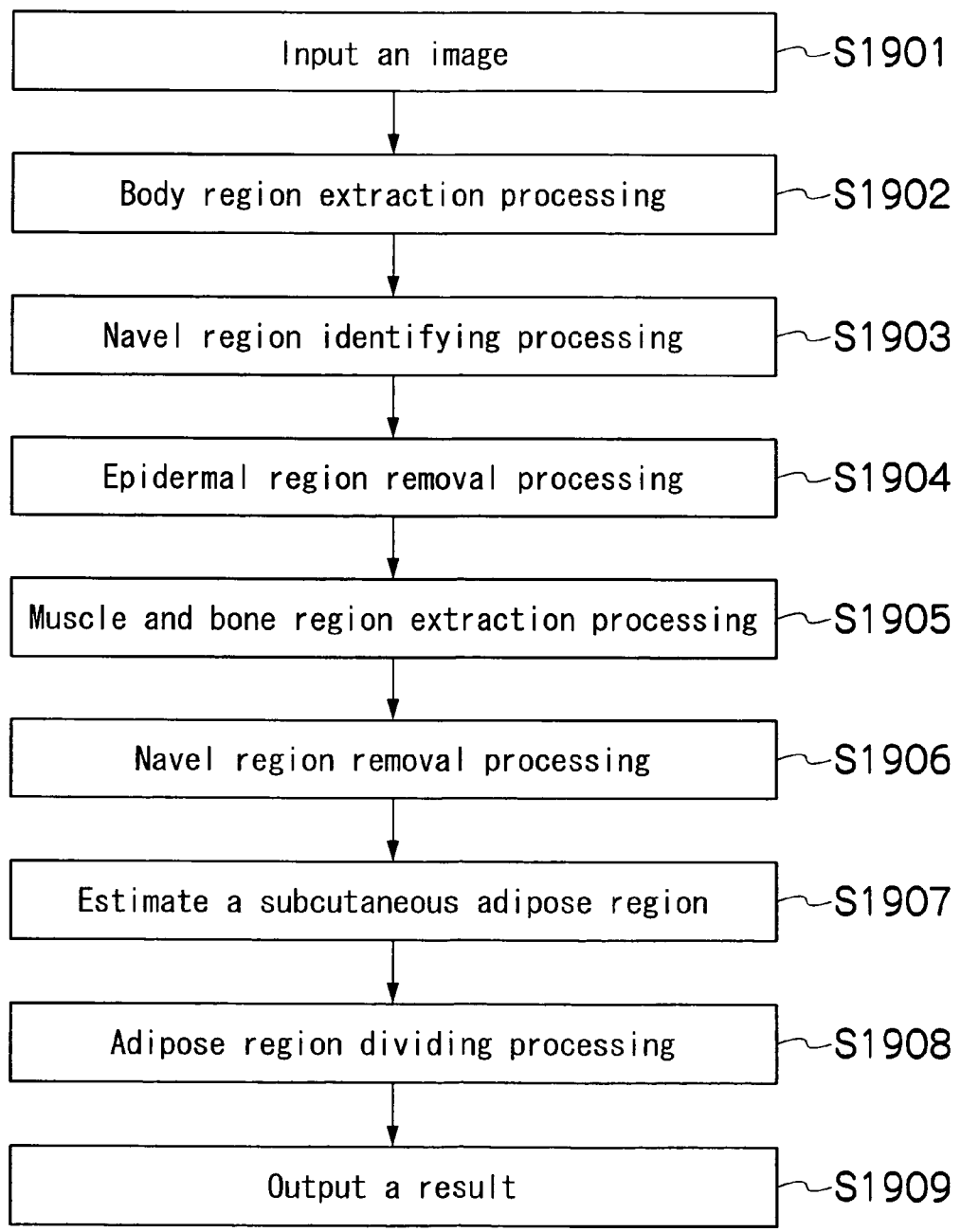
FIG. 19 a flowchart of a third embodiment for measuring body adipose of a subject.

FIG. 19 is a flowchart of a third embodiment for measuring body adipose of a subject using a medical image diagnosing support apparatus 10, Image input is performed as in S201 and S202 in FIG. 2 (S1901), body region extraction processing is performed like the processing in 5203 in FIG. 2 (S1902), and a navel region is identified like the processing in S204 in FIG. 2 or the processing in 51403 in FIG. 14 (S1903). Then, a preset region is removed from the body region extracted in S1902, and thus an epidermal region, i.e., the region where epidermal tissue exists, is removed from a region for body adipose measurement (S1904). Then, extraction processing of a muscle and bone region is performed like the processing in S701 in FIG. 7 (S1905). Then, navel region removal processing (S 1906) and estimation of the subcutaneous adipose region (S1907) are sequentially performed. Then, adipose region dividing processing is performed like the processing in S205 in FIG. 7 or the processing in S1205 in FIG. 12 (S1908), and result output (S1909) is performed as in S207 and 208 in FIG. 2.

Figure 20:
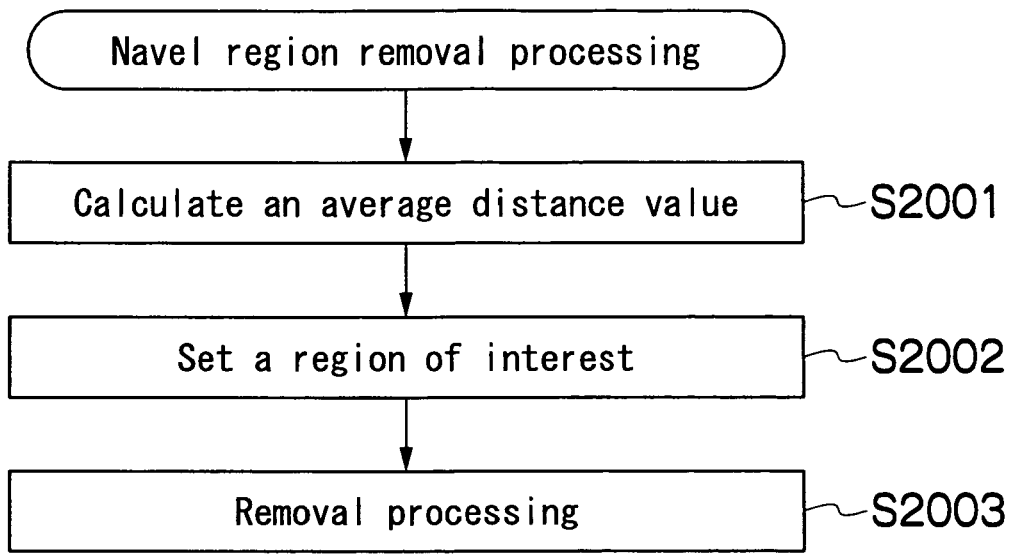
FIG. 20 is a flowchart of navel region removal processing.
Figure 21:
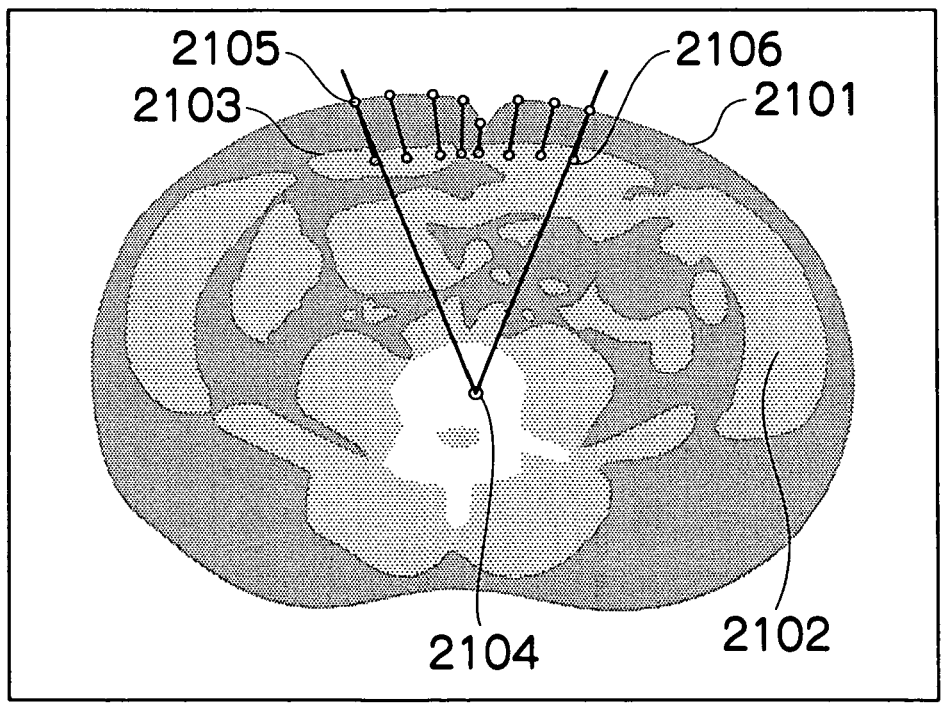
FIG. 21 is a conceptual drawing for illustrating the naval region removal processing.
Figure 22:
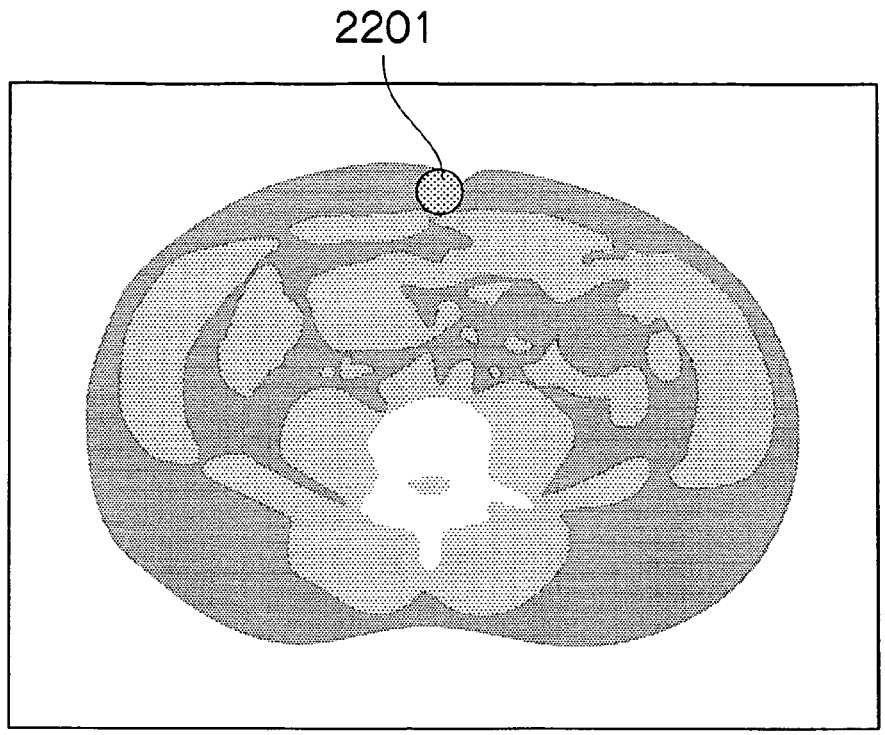
FIG. 22 is a conceptual drawing for illustrating the navel region removal processing.

FIG. 20 is a flowchart of the navel region removal processing (S1906). First, as shown in FIG. 21, on a body region peripheral edge 2101 recognized in S1902 and a peripheral edge 2103 of the muscle and bone region 2102 recognized in S1905, attention points 2105 and 2106 are radially set so as to include the navel region identified in S1903 around the barycenter 2104 of the body region to calculate an average distance between the attention points (S2001). Then, as shown in FIG. 22, a circular region with the average distance calculated in S2001 as a radius is set as a region of interest 2201 in the navel region identified in S1903 (S2002). At this time, a region that does not overlap the body region is removed. Then, the muscle and bone region in the region of interest 2201 is removed (S2003).

Figure 23:
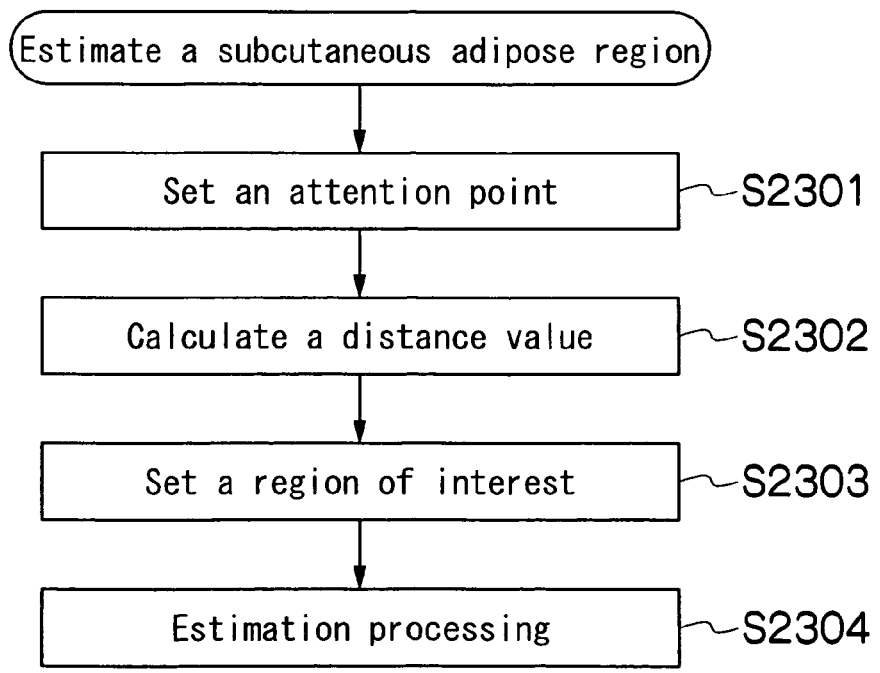
FIG. 23 is a flowchart of estimation of a subcutaneous adipose region.
Figure 24:
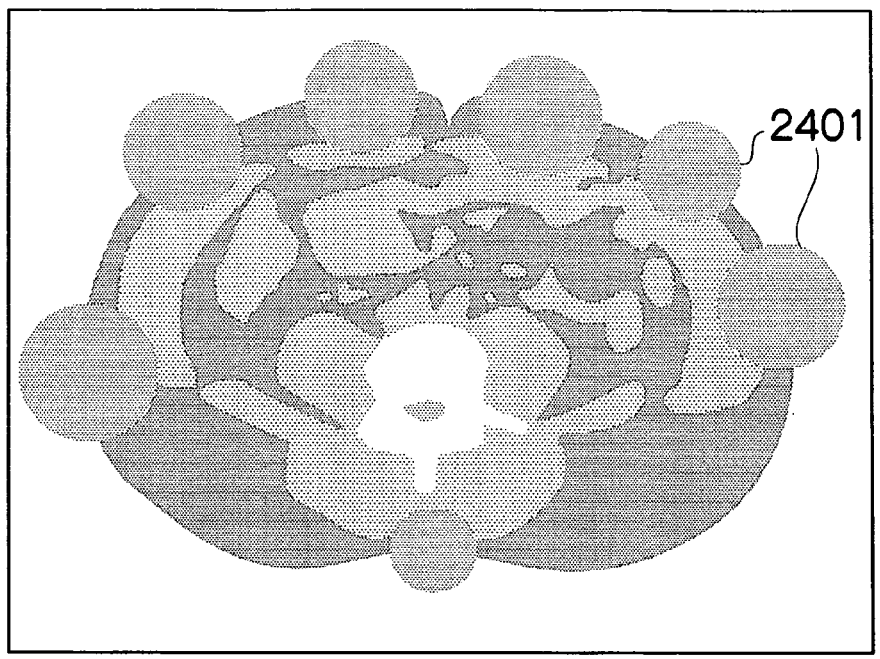
FIG. 24 is a conceptual drawing for illustrating the estimation of the subcutaneous adipose region.

FIG. 23 is a flowchart of the estimation of the subcutaneous adipose region (S1907). First, an attention point is set on a middle point between portions of the muscle and bone region remaining without being removed in S2003 (S2301). Then, a distance value between the attention point and an attention point on the body region peripheral edge is calculated (S2302), and as shown in FIG. 24, a circular region with the distance value calculated in S2302 as a radius is set as a region of interest 2401 (S2303). At this time, based on information on a periphery of the attention point to which attention is paid, a threshold is set to correct the distance value. A region that does not overlap the body region is removed. Then, the muscle and bone region in the region of interest 2401 is removed to estimate the subcutaneous adipose region (S2304).

Figure 25:
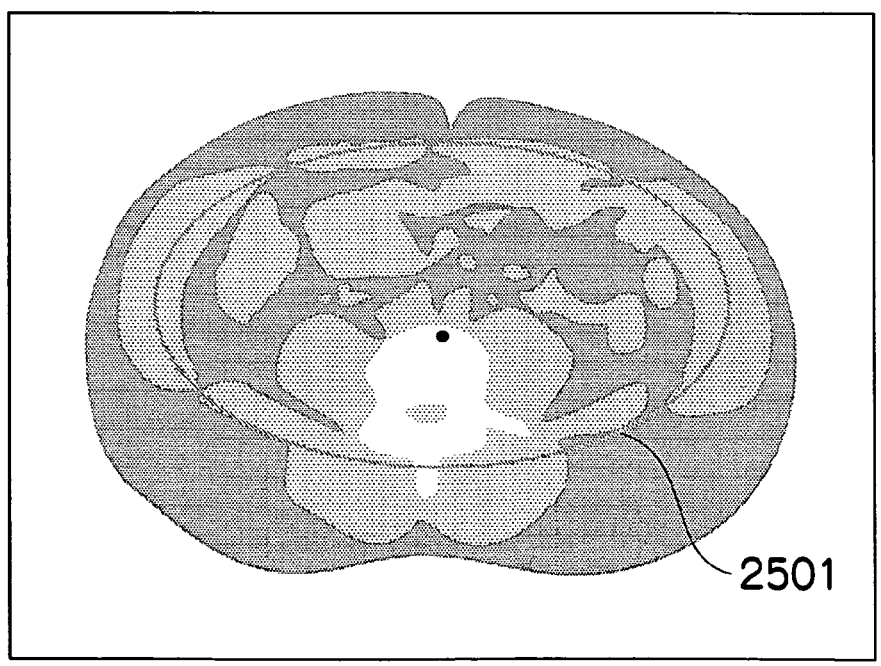
FIG. 25 is a conceptual drawing for illustrating division of the subcutaneous adipose region and a visceral adipose region.

In the adipose region dividing processing (S1908), a boundary line 2501 is set as shown in FIG. 25, and the adipose region is divided on the outside and the inside of the boundary line 2501 into the subcutaneous adipose region and the visceral adipose region.

In the above described embodiment, the example of performing the body adipose measurement processing using the CT image data acquired by the X-ray CT apparatus has been described. When MRI image data acquired by an MRI apparatus is used, the MRI image data has no measure such as the CT value, and thus for example, a dynamic range of the MRI data is adjusted to a dynamic range of the CT image data. Data processing thereafter may be performed as in the case of using the CT image data.

Industrial Applicability

As described above, according to the present invention, a threshold range of adipose pixels that differs depending on subjects may be easily calculated, and region extraction can be automatically performed based on information on a periphery of a site including the adipose pixels to eliminate the need for a manual operation by an operator, thereby improving operability and body adipose measurement accuracy. Further, a clear image display of a measurement result may be obtained.

The invention claimed is:

1. A medical image diagnosing support apparatus comprising:
   a first extraction means which extracts a body region of a subject from a tomographic image of the subject acquired by a medical tomographic apparatus and removes data of an epidermal tissue layer region from data of the body region;
   a second extraction means which automatically (a) searches the tomographic image for a predetermined range of CT values corresponding to an abdominal wall muscle layer to determine from a histogram of the CT values in the predetermined range a most frequently occurring CT value in the predetermined range, (b) sets a threshold by utilizing the most frequently occurring CT value in the predetermined range, (c) applies peripheral edge recognition processing to extract, while utilizing the threshold, an abdominal wall muscle layer region as a non-adipose region from the body region and determine position data for an outline surrounding the abdominal wall muscle layer region, wherein the data of the epidermal tissue layer region has been removed from the data of the body region, and (d) sets a line surrounding the abdominal wall muscle layer region, by contracting a circumscribed circle circumscribing the body region until the circle circumscribes the muscle region, based on the positional data determined for the abdominal wall muscle layer region in (c);
   a third extraction means which extracts a total body adipose region from the body region;
   a separation means which separates the total body adipose region into a visceral adipose region and a subcutaneous adipose region based on whether a specified region is located inside or outside of the line automatically set by the second extraction means to surround the abdominal wall muscle non-adipose layer region; and
   a display control means which controls display of the tomographic image on an image display device with clear indication of the visceral adipose region and the subcutaneous adipose region.

2. The medical image diagnosing support apparatus according to claim 1, wherein the second extraction means performs peripheral edge recognition processing of the non-adipose region, sets a plurality of attention points on a recognized peripheral edge, and interpolates spaces between the plurality of attention points by higher order spline interpolation to extract an outline of the non-adipose region, wherein the separation means separates the total body adipose region into a visceral adipose region and a subcutaneous adipose region based on the outline of the non-adipose region extracted.

3. The medical image diagnosing support apparatus according to claim 1, wherein the third extraction means extracts the total body adipose region by subtracting the non-adipose region from the body region.

4. The medical image diagnosing support apparatus according to claim 1, further comprising a determination means which determines whether the tomographic image is suitable for body adipose measurement,
   wherein the display control means controls to display a determination result by the determination means on the image display device.

5. The medical image diagnosing support apparatus according to claim 4 further comprising a means for extracting the navel region of the subject from the tomographic image of the subject, wherein the determination means determines that the tomographic image is suitable for body adipose measurement when an air region is within a predetermined ratio and when the navel region is included in the extracted non-adipose region.

6. The medical image diagnosing support apparatus according to claim 4, wherein when the determination means obtains error information that the tomographic image is not obtained from a site suitable for body adipose measurement of the subject or not acquired by a predetermined medical tomographic apparatus, the display control means controls to display the error information on the image display device.

7. The medical image diagnosing support apparatus according to claim 1, further comprising an area ratio calculation means which calculates area ratios of the total body adipose region, the visceral adipose region, and the subcutaneous adipose region,
   wherein the display control means controls to display the area ratios calculated by the area ratio calculation means on the image display device.

8. The medical image diagnosing support apparatus according to claim 7, further comprising a print output means which prints and outputs the tomographic image and the area ratios controlled to be displayed on the image display device by the display control means.

9. A medical image diagnosing support apparatus according to claim 1, wherein the separation means extracts a region between a contracted circumscribed circle and a muscle region as the subcutaneous adipose region, when the circumscribed circle, which circumscribes the body region divided radially into predetermined numbers having the barycenter of the body region as the center, is contracted until the circle circumscribes the muscle region which is extracted by performing threshold processing to the body region.

10. The medical image diagnosing support apparatus according to claim 1 further comprising means for extracting a navel region of the subject from the tomographic image of the subject, wherein the separation means extracts a region where muscle and bone region are removed as the subcutaneous adipose region from a portion of the body region included in a circular area of interest in which a radius of the circular area is half of a distance between a first attention point set at a peripheral edge of the non-adipose region and a second attention point set at middle point of each partial region of the muscle and bone region included in the regions where the navel region is removed from the extracted body region.

11. The medical image diagnosing support apparatus according to claim 1, wherein the second extraction means sets the line surrounding the non-adipose region using peripheral edge recognition processing.

12. A medical image diagnosing support method comprising:
   a first extraction step of extracting, by a medical image diagnosis support apparatus, a body region of a subject from a tomographic image of the subject acquired by a medical tomographic apparatus and removes data of an epidermal tissue layer region from data of the body region;
   a second extraction step of automatically (a) searching the tomographic image for a predetermined range of CT values corresponding to an abdominal wall muscle layer to determine from a histogram of the CT values in the predetermined range a most frequently occurring CT value in the predetermined range, (b) setting a threshold by utilizing the most frequently occurring CT value in the predetermined range, (c) applying peripheral edge recognition processing to extract, while utilizing the threshold, an abdominal wall muscle layer region as a non-adipose region from the body region and determine position data for an outline surrounding the abdominal wall muscle layer region, wherein the data of the epidermal tissue layer region has been removed from the data of the body region, and (d) setting, by the medical image diagnosis support apparatus, a line surrounding the abdominal wall muscle layer region, by contracting a circumscribed circle circumscribing the body region until the circle circumscribes the muscle region, based on the positional data determined for the abdominal wall muscle layer region in (c);

a third extraction means which extracts a total body adipose region from the body region;

a separation means which separates the total body adipose region into a visceral adipose region and a subcutaneous adipose region based on whether a specified region is located inside or outside of the line automatically set by the second extraction means to surround the abdominal wall muscle non-adipose layer region; and a display control means which controls display of the tomographic image on an image display device with clear indication of the visceral adipose region and the subcutaneous adipose region.

13. The medical image diagnosing support method according to claim 12, wherein peripheral edge recognition processing of the non-adipose region is performed, a plurality of attention points are set on a recognized peripheral edge, and spaces between the plurality of attention points are interpolated by higher order spline interpolation to extract an outline of the non-adipose region in the second extraction step.

14. The medical image diagnosing support method according to claim 12, wherein in the third extraction step, the total body adipose region are extracted by subtracting the non-adipose region from the body region.

15. The medical image diagnosing support method according to claim 12, further comprising a determination step of determining whether the tomographic image is suitable for body adipose measurement, wherein a determination result by the determination step is controlled to be displayed on the image display device in the display control step.

16. The medical image diagnosing support method according to claim 15, wherein when error information that the tomographic image is not obtained from a site suitable for body adipose measurement of the subject or not acquired by a predetermined medical tomographic apparatus is obtained in the determination step, the error information is controlled to be displayed on the image display device in the display control step.

17. The medical image diagnosing support method according to claim 12, further comprising an area ratio calculation step of calculating area ratios of the total body adipose region, the visceral adipose region, and the subcutaneous adipose region, wherein the area ratios calculated by the area ratio calculation means are controlled to be displayed on the image display device in the display control step.

18. The medical image diagnosing support method according to claim 17, further comprising a print output step of printing and outputting the tomographic image and the area ratios controlled to be displayed on the image display device in the display control step.

19. The medical image diagnosing support method according to claim 12, wherein the second extraction step sets the line surrounding the non-adipose region using peripheral edge recognition processing.

* * * * *